United States Patent [19]

Fukushima et al.

[11] Patent Number: 5,537,244
[45] Date of Patent: Jul. 16, 1996

[54] LIGHT AMPLIFIER

[75] Inventors: Nobuhiro Fukushima; Hisashi Takamatsu, both of Kawasaki, Japan

[73] Assignee: Fujitsu Limited, Kawasaki, Japan

[21] Appl. No.: 396,790

[22] Filed: Mar. 1, 1995

[30] Foreign Application Priority Data

Jun. 30, 1994 [JP] Japan ................. 6-150227

[51] Int. Cl.⁶ ............................................. H01S 3/00
[52] U.S. Cl. ............................... 359/341; 359/177
[58] Field of Search ............................. 359/341, 177

[56] References Cited

U.S. PATENT DOCUMENTS

| | | | |
|---|---|---|---|
| 5,239,607 | 8/1993 | da Silva et al. | 359/341 X |
| 5,278,686 | 1/1994 | Grasso et al. | 359/110 |
| 5,355,250 | 10/1994 | Grasso et al. | 359/341 |
| 5,374,973 | 12/1994 | Maxham et al. | 359/341 |

FOREIGN PATENT DOCUMENTS

| | | |
|---|---|---|
| 2-281111 | 11/1990 | Japan . |
| 5-019311 | 1/1993 | Japan . |

*Primary Examiner*—Mark Hellner
*Attorney, Agent, or Firm*—Staas & Halsey

[57] ABSTRACT

A light amplifier includes an optical fiber doped with a rare-earth ion, a light source emitting an exciting light and thereby exciting the optical fiber, and an optical system which applies a given light component to the optical fiber in a first direction opposite to a second direction in which a signal light is propagated through the optical fiber when a light exceeding a threshold level is propagated through the optical fiber, so that a gain of the optical fiber can be reduced.

17 Claims, 4 Drawing Sheets

LIGHT AMPLIFIER

BACKGROUND OF THE INVENTION

1. Field of the Invention

The present invention generally relates to light amplifiers suitable for, for instance, optical communications systems and more particularly to a light amplifier which amplifies a signal light introduced into an optical fiber which is doped with an rare-earth ion, such as an erbium ion, which is in an excited state.

2. Description of the Prior Art

Recently, there has been considerable activity in the research and development of a light amplifier using a fiber doped with a rare-earth ion, such as an erbium ion. Hereinafter, such a fiber is referred to as an erbium-doped fiber (EDF). The erbium-doped fiber has a nature such that energy is stored in the excited state when no light signal is applied thereto. The light amplifier using such an erbium-doped fiber has a very high gain in a state in which no light input signal is applied thereto but an exciting light is input thereto. If a light input signal is abruptly applied to the light amplifier, a pulse-like light having a very high peak level may be generated therein. Such a pulse-like light is called a light surge pulse. The light surge pulse occurring in the light amplifier will damage an optical system following the light amplifier.

A conventional method for coping with the above problem uses a monitor which detects a light surge pulse and is provided in the light amplifier. If the monitor detects a light surge pulse, it turns OFF a light source for exciting the erbium-doped fiber provided in the light amplifier.

However, the inverted distribution of the erbium-doped fiber does not directly relate to excitation. Hence, the above conventional method has a restriction regarding the response.

SUMMARY OF THE INVENTION

It is a general object of the present invention to provide a light amplifier in which the above problem is eliminated.

A more specific object of the present invention is to provide a light amplifier in which the gain of an optical fiber, having the light amplifying function, is automatically adjusted to quickly cope with an undesirable event such as the occurrence of a light surge pulse.

The above objects of the present invention are achieved by a light amplifier comprising:

an optical fiber doped with, at least, a rare-earth ion, a signal light propagating therethrough in a first direction;

a light source emitting an exciting light and thereby exciting the optical fiber;

an optical system which applies a light component to the optical fiber in a second direction opposite to a first direction in which a signal light is propagated through the optical fiber, when a light exceeding a threshold level is propagated through the optical fiber, so that a gain of the optical fiber can be reduced.

For example, the optical system comprises an optical path of a loop shape which causes induced emission to occur in the optical fiber in the second direction when a light exceeding the threshold level is propagated through the optical system.

For example, the optical system comprises a first branch coupler which divides light applied to the light amplifier into two light components in a predetermined ratio, one of the two light components being applied to the optical fiber, an optical path which receives one of the two light components from the first branch coupler and contains a saturable absorbent, and a second branch coupler which couples the optical path and the optical fiber together so that a light output from the optical path, produced in response to the other one of the two light components is propagated through the optical fiber in the second direction, a saturation intensity of the saturable absorbent being higher than an intensity of the signal light.

For example, a length of the optical path is shorter than a distance between the first branch coupler and the optical fiber doped with the rare-earth ion.

For example, a length of the optical path comprises a glass fiber containing glass doped with erbium as the saturable absorbent.

For example, the light amplifier comprises detection means, coupled to the optical path, for detecting the given light component and outputting a detection signal.

For example, the optical system comprises a light isolator provided in the optical path.

For example, the light amplifier further includes a light isolator provided on an input side of the first branch coupler.

The above objects of the present invention are also achieved by a light amplifier comprising:

an optical fiber doped with, at least, a rare-earth ion, a signal light being propagated through the optical fiber;

a light source emitting an exciting light and thereby exciting the optical fiber;

a first branch coupler dividing light applied to the light amplifier in a predetermined ratio;

an optical path coupled to the first branch coupler;

a second branch coupler coupling the optical path and the optical fiber together; and a light isolator provided in the optical path, a loop including the optical fiber and the optical path oscillating when light having a level higher than a given level passes through the optical fiber.

For example, the above light amplifier further comprises an attenuator provided in the loop, the attenuator adjusting a gain of oscillation occurring in the loop.

For example, the optical path comprises an optical fiber containing a saturable absorbent.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

A description will first be given of a saturable absorbent. The saturable absorbent has a variable absorbing coefficient depending on the intensity of light applied thereto. When weak light is incident on the saturable absorbent, the saturable absorbent absorbs the weak light very well. When the intensity of light exceeds a given level, the light absorbing performance of the saturable absorbent is drastically reduced and the light is allowed to pass through the saturable absorbent.

Figure 1A:
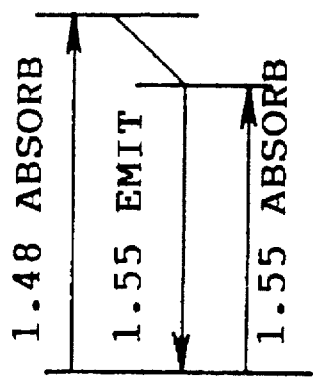
FIGS. 1A, 1B and 1C show a saturable absorbent characteristic of an erbium-doped fiber.
Figure 1B:
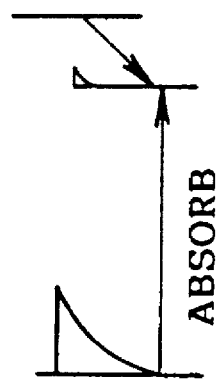
Figure 1C:
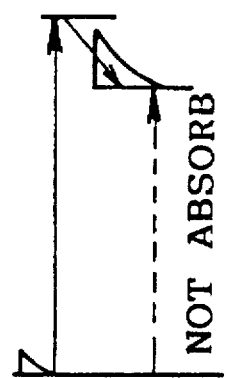

FIGS. 1A, 1B and 1C are diagrams of a saturable absorbing characteristic of erbium (Er) which is well known as a saturable absorbent. In these figures, the horizontal lines denote the energy levels. As shown in FIG. 1B, light is absorbed very well when there are many excited electrons at the lower level. As shown in FIG. 1C, light is not absorbed very well when there are many excited electrons at the upper level. The erbium ion is switched to the excited state once upon absorbing light having a wavelength of 1.55 μm. The erbium ion in the excited state does not absorb the 1.55 μm light. The life time of the above excited state is approximately 10 ms. When a strong signal, such as a light surge pulse, is applied to the erbium ion in the excited state, the saturable absorbent having the erbium ion is in the transparent state for only the above time.

The degree of saturation of an erbium-doped fiber in which glass is doped with the erbium ion can be adjusted by changing the length of the fiber or the concentration of the erbium ion. The above erbium-doped fiber has a longer life time of the excited state than that of a saturable absorbent using a normal coloring matter, and has a good compatibility with a normal optical fiber. Further, the erbium-doped fiber has an operation wavelength (1.55 μm) equal to that of a normal signal light.

Figure 2:
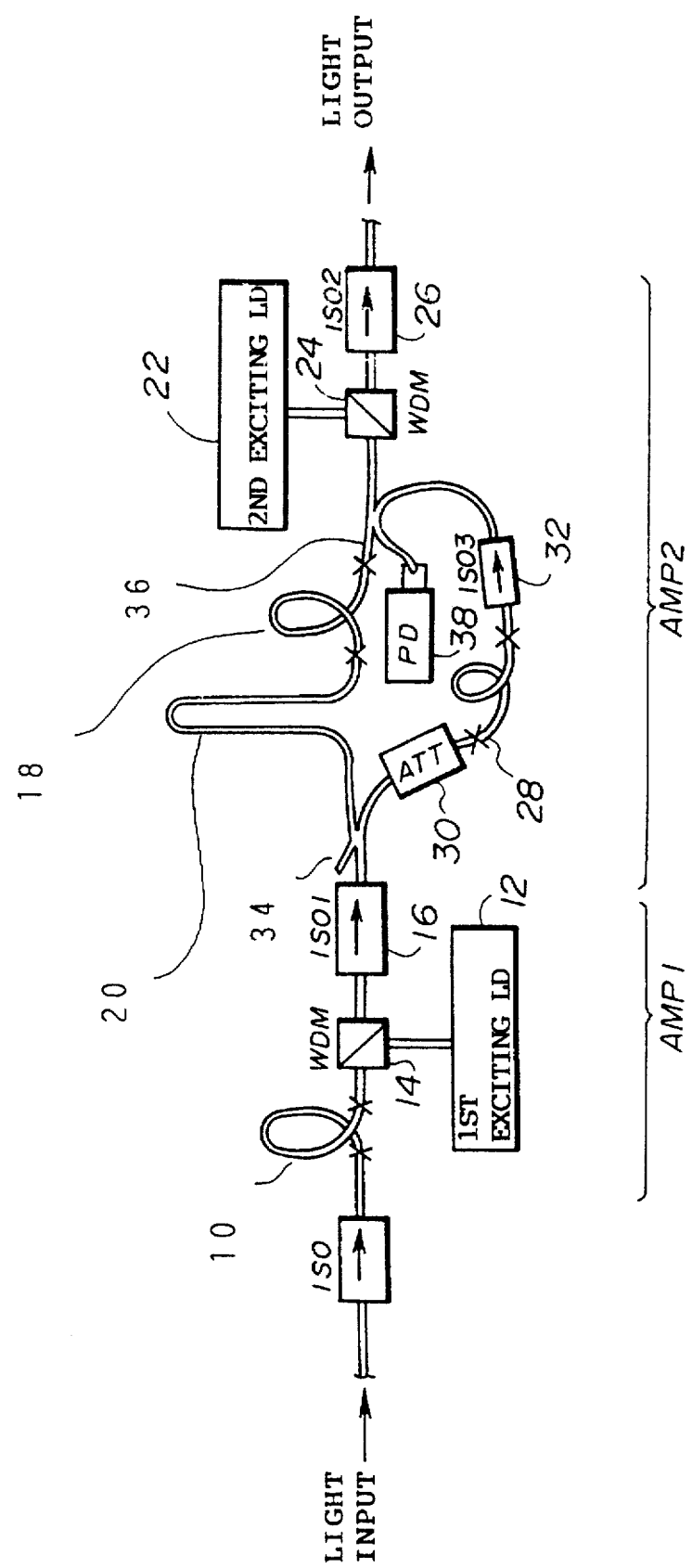
FIG. 2 is an optical system including a light amplifier according to a first embodiment of the present invention.

FIG. 2 is a diagram of a light amplifying system having a light amplifier including an erbium-doped fiber according to a first embodiment of the present invention. The light amplifying system shown in FIG. 2 is provided, for example, in a light repeater, and has two stages of first and second light amplifiers AMP1 and AMP2, which are cascaded. The first light amplifier AMP1 has a structure that is conventionally used. The second light amplifier AMP2 has a unique structure according to the first embodiment of the present invention.

It will be noted that an actual light amplifying system has a plurality of cascaded amplifiers. It can be seen that the structure shown in FIG. 2 is part of a system having a plurality of cascaded light amplifiers. In other words, the structure shown in FIG. 2 can be applied to not only a light amplifying system having two light amplifiers but also to another, different light amplifying system having more than two light amplifiers. If a surge light pulse occurs in one of the light amplifiers, the following light amplifiers may be damaged. For example, there is a possibility that a light surge pulse may occur if a connector of the first amplifier AMP1 shown in FIG. 2 is attached to or detached from an optical fiber. In this case, the second light amplifier AMP2 may be damaged due to, for example, a light surge pulse caused by the attachment or detachment operation.

The first light amplifier AMP1 is made up of a first erbium-doped fiber 10, a first exciting light source 12 formed by a laser diode (LD) or the like, a first wavelength duplication multiplexer (WDM) 14, and a first isolator (ISO1) 16. In FIG. 2, symbol "x" denotes a splice connection. A light input is applied to the first light amplifier AMP1 via an isolator ISO connected to an end of an optical fiber provided on the input side of the system. The first erbium-doped fiber 10 is an optical fiber containing glass doped with the erbium ion. The first exciting light source 12 excites the first erbium-doped fiber 10 via the first waveform duplication multiplexer 14, which functions as a waveform combiner, or mixer, and combines the input light with the exciting light emitted by the source 12. The light signal passing through the first erbium-doped fiber 10 is input to the second light amplifier AMP2 via the first light isolator 16.

The second light amplifier AMP2 is made up of a second erbium-doped fiber 18, a delay optical fiber 20, a second exciting light source (LD) 22, a second wavelength duplication multiplexer (WDM) 24, a second light isolator (ISO2) 26, a third erbium-doped fiber 28, an attenuator (ATT) 30, a third light isolator (ISO3) 32, a first branch coupler 34, a second branch coupler 36, and a photodetector (PD) 38. The first branch coupler 34 divides the light from the first light isolator 16 into two components in a given ratio. For example, the light is made to branch into two components in the ratio 10:1, and the relatively weaker light component is made to pass through the third erbium-doped fiber 28. The first branching light component enters into the second erbium-doped fiber 18 via the delay fiber 20. The second branching light component enters into the third erbium-doped fiber 28 via the attenuator 30. The second erbium-doped fiber 18 is connected to the branch coupler 36. The third erbium-doped fiber 28 is coupled to the second branch coupler 36 via the third light isolator 32. The second exciting light source 22 excites the second erbium-doped fiber 18 via the second waveform duplication multiplexer 24. The output light of the second waveform duplication multiplexer 24 is output to an optical fiber provided on the output side of the system via the second light isolator 26.

The third erbium-doped fiber 28, the attenuator 30 and the third light isolator 32 form a light path, or optical path, that functions, if light having an intensity exceeding a given light intensity, such as a light surge pulse, is input to the first branch coupler 34, to apply, via the second coupler 36, a light traveling in the reverse of the direction in which the signal light passes through the second erbium-doped fiber 18 whereby the gain of the second erbium-doped fiber 18 can be reduced. More particularly, the above optical path causes an induced emission to take place in the second erbium-doped fiber 18 in the reverse of the direction in which the signal light passes therethrough. In this case, the delay fiber 20 functions to delay the light from the first branch coupler 34 so that the above induced emission occurs before the light surge pulse passes through the delay fiber 20 and arrives at the second erbium-doped fiber 18.

The operation of the system shown in FIG. 2 will now be described.

First of all, the normal operation of the system will be described below. The signal light amplified by the first light amplifier AMP1 is made to branch into two light components in a given ratio (10:1 for example) by means of the first branch coupler 34. The second relatively weak light component passes through the attenuator 30 and enters into the third erbium-doped fiber 28. The second light component is greatly absorbed by the third erbium-doped fiber 28 because the light component does not reach the saturated intensity. Hence, no light is emitted from the third erbium-doped fiber 28. In normal operation, the intensity of light entering into the third erbium-doped fiber 28 can be adjusted by not only the branching ratio of the first branching coupler 34 but also the degree of attenuation developing across the attenuator 30. The light component traveling toward the third erbium-doped fiber 28 from the second branch coupler 36 is isolated by the third light isolator 32.

Next, a description will now be given of the operation of the system shown in FIG. 2 carried out when no signal light comes into the second light amplifier AMP2 and a light surge pulse enters therein.

The occurrence of the light surge pulse will now be described. By way of example, it will now be considered that the input level of the first light amplifier AMP1 is cut off. Normally, the erbium-doped fiber 10 in the first light amplifier AMP1 performs a control such that the output intensity of light is at a constant level. Hence, the intensity of the excited light is increased in order to increase the intensity of the output light when the input level reduces. When no signal light is applied to the first amplifier AMP1, the erbium-doped fiber has a nature such that energy is stored in the excited state. In a state in which no signal light is applied to the erbium-doped fiber and the exciting light is applied thereto, the gain of the amplifier using the erbium-doped fiber is extremely high. For example, the gain obtained in the above state instantaneously becomes 100 times the normal gain. If an abrupt light is input to the erbium-doped fiber in the above-described state due to, for example, attachment or detachment of the connector, a light having an extremely high peak intensity level will be instantaneously generated by the erbium-doped fiber. Such a light is a light surge pulse. Normally, the light surge pulse has a duration of, for example, a few milliseconds.

The light surge pulse is divided into the two light components by the first branch coupler 34. One of the divided surge pulse components enters into the delay optical fiber 20, and the other surge pulse component enters into the third erbium-doped fiber 28 via the attenuator 30. The surge pulse component entering into the third erbium-doped fiber 28 passes therethrough because it exceeds the saturation intensity thereof (at which the fiber 28 is saturated), and then enters into the second erbium-doped fiber 18 via the third light isolator 32 and the second branch coupler 36. At this time, the other divided surge pulse component entering into the delay fiber 20 is still passing therethrough, and has not yet reached the second erbium-doped fiber 18.

The distributed surge pulse component entering into the second erbium-doped fiber 18 via the second branch coupler 36 has a high peak power, and hence effectively causes induced emission of the electrons in the second erbium-doped fiber 18. Hence, a light generated by the above induced emission is propagated through the delay fiber 20 in the reverse of the direction in which the signal light travels, and is then interrupted by the first light isolator 16. Hence, the first light amplifier AMP1 is not affected by the light traveling in the reverse direction. Immediately after the distributed surge pulse component from the second branch coupler 36 passes through the second erbium-doped fiber 18, the second erbium-doped fiber 18 is no longer in the excited state, but has the absorbing performance. The distributed surge pulse component passing through the delay fiber 20 enters into the second erbium-doped fiber 18, which is already in the absorbing performance state, and is therefore absorbed therein.

The light surge pulse has a duration of a few milliseconds. After the light surge pulse disappears, the third erbium-doped fiber 28 returns to the light absorbent state due to emission of light from the excited state. The second erbium-doped fiber 18, on the other hand is switched to the excited state upon receipt of the signal light.

As described above, according to the first embodiment of the present invention, it is possible to definitely absorb the light surge pulse within the light amplifier and to hence prevent propagation of it toward the subsequent stage. Further, according to the first embodiment of the present invention, the light amplifier is capable of automatically returning to the normal state after absorbing the light surge pulse. The above advantages are very effective in practical use. It should be noted that the prior art does not suppress the light surge pulse itself but detects it and controls the exciting light source. Hence, the prior art does not have the advantages provided by the first embodiment of the present invention.

In principle, the attenuator 30 and the third isolator 32 shown in FIG. 2 may be omitted. However, it is desirable that the attenuator 30 and the third isolator 32 be employed, in practical use.

The photodetector 38 receives the light surge pulse from the third erbium-doped fiber 28 via the third isolator 32 and the second branch coupler 36, and is used to provide an alarm when receiving the light surge pulse. However, the photodetector 38 may be omitted.

Figure 3:
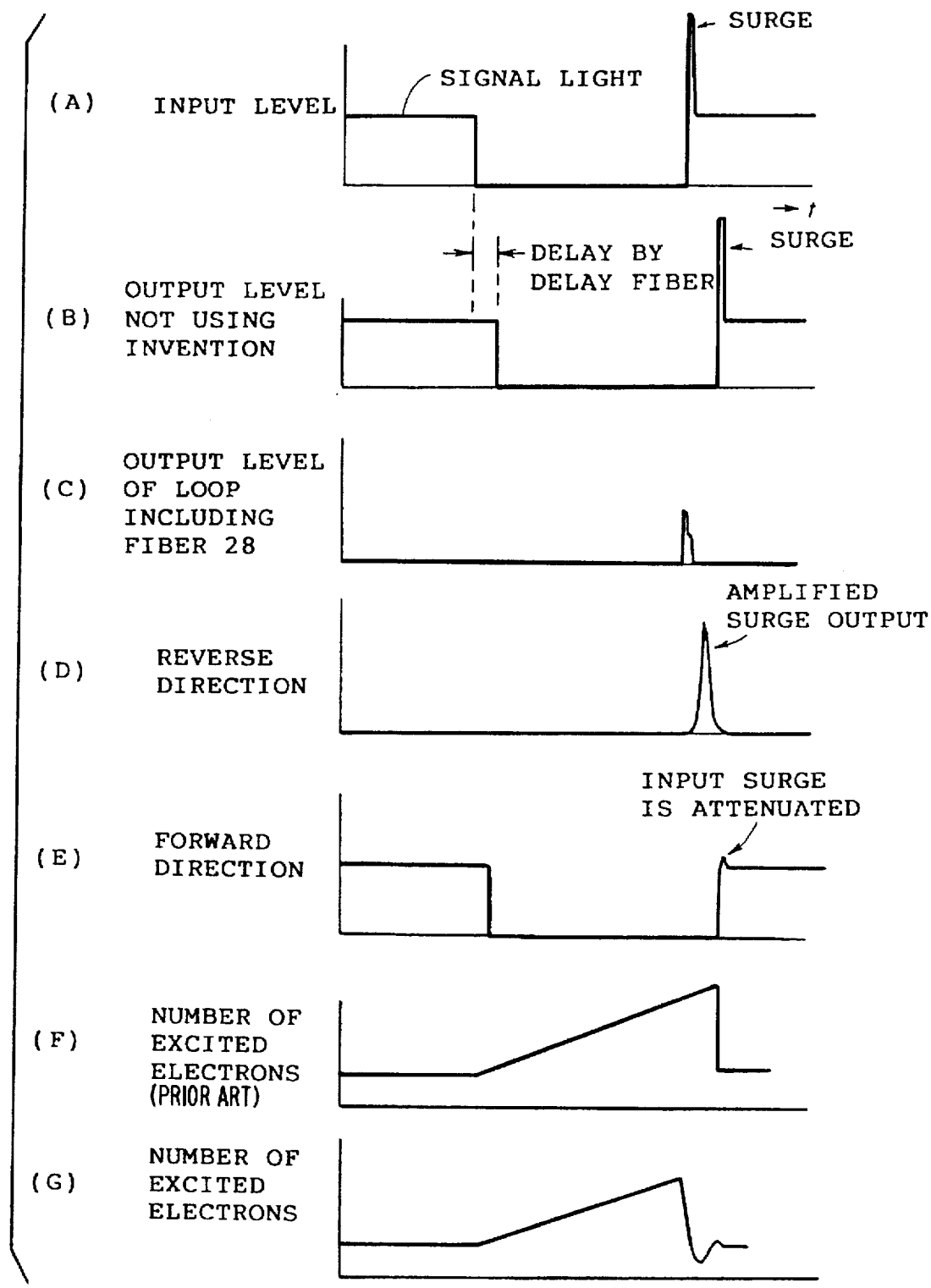
FIG. 3 is a waveform diagram showing the operation of the system shown in FIG. 2.

The advantages of the first embodiment of the present invention will be described in more detail, as compared with the prior art. FIG. 3 shows waveforms observed at parts of the system when the signal light becomes nothing and, thereafter, a light surge pulse is input to the second light amplifier AMP2 shown in FIG. 2 from the first light amplifier AMP1. FIG. 3 also shows waveforms which would be observed when a light surge pulse is input to a second light amplifier having a conventional configuration, e.g., similar to that of the first amplifier AMP1 shown in FIG. 1.

Part (A) of FIG. 3 shows the input of the second light amplifier AMP2. As shown in part (A) of FIG. 3, the signal light becomes nothing (i.e., decreases to zero intensity, or terminates), and thereafter a light surge pulse occurs which is applied to the second amplifier AMP2 caused by, e.g., the connector of the first erbium-doped fiber 10 being detached or a fault occurring in a preceding light repeater. Part (B) of FIG. 3 shows the output of a second light amplifier having a conventional structure, identical to that of the first amplifier AMP1 shown in FIG. 2. The second light amplifier output has a delay of time caused by the delay optical fiber 20. That is, the signal light applied to the second light amplifier is output therefrom with the above delay of time, and the light surge pulse applied thereto is output therefrom with the same delay of time. At this time, the second erbium-doped fiber 18 of the second light amplifier having the conventional structure has an extremely high gain, as shown in part (F) of FIG. 3.

Part (C) of FIG. 3 shows the output of the third erbium-doped fiber 28. The third erbium-doped fiber 28 absorbs the distributed signal light component, but allows the distributed light surge pulse component to pass therethrough. Part (D) of FIG. 3 shows the output (in the reverse direction) of the second erbium-doped fiber 18, observed at the connecting point where the fiber 18 and the delay fiber 20 are joined together. As shown in part (G) of FIG. 3, electrons are gradually stored in the excitation level of the second erbium-doped fiber 18, which thus has a very high gain. In this state, the light surge pulse enters into the second erbium-doped fiber 18 in the reverse direction. Hence, most of the electrons in the excitation level of the second erbium-doped fiber 18 are caused to fall into the ground level by the light surge pulse. Then, the distributed light surge pulse enters into the second erbium-doped fiber 18 from the delay fiber 20. However, at this time, the second erbium-doped fiber 18 is already changed to the light absorbing state. Hence, as shown in part (E) of FIG. 3, the output of the second erbium-doped fiber 18 in the forward direction has a sufficiently attenuated light surge pulse component. As a result, the light surge pulse of the original high level is not output to the stage subsequent to the second amplifier AMP2 (e.g., a light repeater of the next stage, for example).

The detail of the parts regarding the system shown in FIG. 2, such as parameters thereof, will be described below. It is desirable that the first branch coupler 34 have a little degree of reflection and a stable splice type. The branch ratio of the first branch coupler 34 is approximately 10:1. The first, second and third erbium-doped fibers 10, 18 and 28 may be made of an identical material or respective different materials. The length of the third erbium-doped fiber 28 is increased when the concentration of the erbium ion is low, and is decreased when the concentration of the erbium ion is high. The above holds true for the second branch coupler 36.

Under the above condition, the input signal level at the branch coupler 34 is normally equal to −3 dBm. When a light surge pulse is input to the branch coupler 34, the input level thereof is approximately equal to 10 dBm. The length of the third erbium-doped fiber 28 is adjusted so that the fiber 28 absorbs light having a level of −7 dBm and is in the saturated state with light of 0 dBm. The saturation intensity is set equal to approximately −5 dBm. In this case, light of a level of −10 dBm passing through the first branch coupler 34 is absorbed by the third erbium-doped fiber 28. A light surge pulse is distributed in the ratio 10:1 at the branch coupler 34.

One of the distributed surge pulse components passes through the third erbium-doped fiber 28 while being reduced, and arrives through isolator ISO3 at the second branch coupler 36. At this time, the level of the surge pulse component from the third erbium-doped fiber 28 is between −10 dBm and −20 dBm. Since the second erbium-doped fiber 18 has a high gain at the time of occurrence of a light surge pulse, the surge pulse arriving at the branch coupler 36 from the third erbium-doped fiber 28 and having a very low level is rapidly amplified to a level sufficient to decrease the gain of the second erbium-doped fiber 18.

The length of the delay fiber 20 is adjusted so that the other distributed surge pulse component arrives at the second erbium-doped fiber 18 after the gain of the second erbium-doped fiber 18 is decreased. It is desirable that the attenuator 30 adjusts (decrease) the intensity of the light entering into the third erbium-doped fiber 28 if the third erbium-doped fiber 28 cannot completely or sufficiently absorb the light having the normal level.

Figure 4:
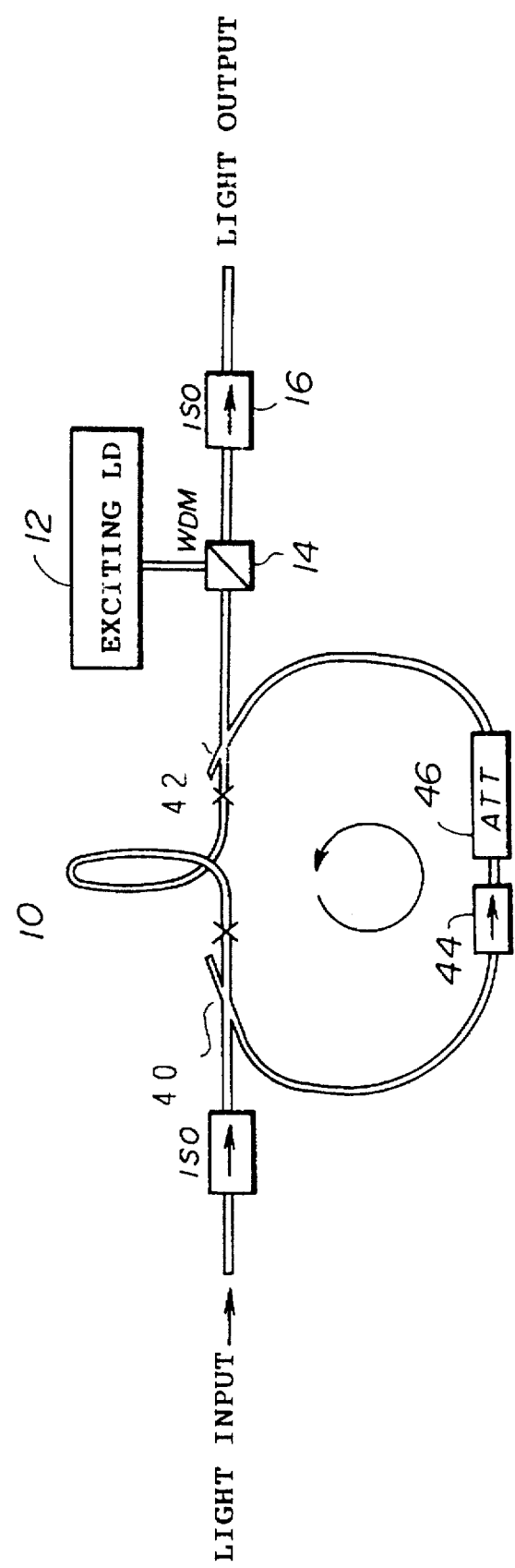
FIG. 4 is a block diagram of a light amplifier according to a second embodiment of the present invention.

A description will now be given, with reference to FIG. 4, of a second embodiment of the present invention. In FIG. 4, parts that are the same as those shown in FIG. 2 are given the same reference numbers. The light amplifier shown in FIG. 4 adds an additional optical path to the configuration including the erbium-doped fiber 10, the exciting light source 12, the wavelength duplication multiplexer 14 and the light isolator 16 of FIG. 2. The added optical path includes a first branch coupler 40, a second branch coupler 42 a light isolator 44 provided between the couplers 40 and 42 and an attenuator 46. A loop is made up of the first and second branch couplers 40 and 42, the erbium-doped fiber 10, the light isolator 44 and the attenuator 46. The light isolator 44 is connected so that it allows light to pass therethrough in the reverse of the direction in which the signal light travels. The above loop forms a ring laser.

The detail of the ring laser will now be described. The erbium-doped fiber 10 is in the excited state, in which induced emission takes place, and a laser oscillation can easily occur with a feedback loop including a resonator. Normally, the light amplifier is designed to avoid laser oscillation because the laser oscillation emits light in addition to the signal light and reduces the gain for the signal light. A resonator generally used is of a Fabry-Perrot type in which two reflection mirrors are used. Another resonator of a ring type is known in which a looped optical path is formed. In the ring type resonator, there are two light components, which respectively propagate through the loop in clockwise and counterclockwise directions (two modes). By inserting an isolator in the loop, it is possible to prevent one of the two light components from being circulated and thus to cause oscillation in one of the modes. The oscillation will not occur if the gain does not increase to a threshold level which is dependent on resonator loss.

In FIG. 4, a ring laser is formed by the loop, including the branch couplers 40 and 42, coupled to the two opposite ends of the erbium-doped fiber 10. The isolator 46 provided in the above loop allows the light to be propagated through the loop in the counterclockwise direction.

The operation of the light amplifier shown in FIG. 4 is as follows. In normal operation, the signal light, input via the light isolator ISO, passes through the first branch coupler 40, the erbium-doped fiber 10, the second branch coupler 42, the wavelength duplication multiplexer 14 and the second branch coupler 16, and is output to the next stage. The excited state of the erbium-doped fiber 10 is reduced by amplifying the signal light, and hence the gain in the counterclockwise direction on the loop is lower than the oscillation threshold level. In this state, it is possible to consider that there is no loop.

When the erbium-doped fiber 10 has an increased gain, the loop starts to oscillate for itself, and hence the gain of the erbium-doped fiber 10 is decreased. This response is carried out at a high speed, and hence does not depend on the response of the control system for the exciting source 12. The light generated by the above oscillation travels in the reverse of the direction in which the signal light travels, and is hence interrupted by the light isolator ISO. Hence, the system, including the light amplifier or amplifiers, is not affected by the light traveling in the reverse direction. Hence, it is possible to completely prevent occurrence of a light surge pulse. The oscillation initiating gain can be adjusted by the attenuator 46 provided in the loop.

The first branch coupler 40 is of a splice type and is in the ratio 9:1, for example. The induced emission is caused when the gain of the erbium-doped fiber 10 is increased because a light surge pulse will occur when the gain of the erbium-doped fiber 10 is increased. The induced emission is caused by the above-mentioned ring laser including the erbium-doped fiber 10. The loss S of the counterclockwise loop is as follows:

$$\begin{aligned} S &= \text{(loss of coupler 40)} + \text{(loss of isolator 44)} + \\ &\quad \text{(loss of attenuator 46)} + \text{(loss of coupler 42)} \\ &= 10 \text{ dB} + 1 \text{ dB} + (1 - 50) \text{ dB} + 10 \text{ dB} \end{aligned}$$

When the above loss S is less than the gain of the erbium-doped fiber 10, the laser oscillation takes place. Hence, it is required that the normal level of the gain of the erbium-doped fiber 10 be higher than the loss S and that the loss S be less than the gain at which the light surge pulse takes place. Generally, the gain of the erbium-doped fiber 10 is approximately between 20 dB and 30 dB, and the light surge pulse may occur if the gain of the erbium-doped fiber 10 increases to approximately 40 dB although the gain level, which may cause the light surge pulse, depends on the individual case. For example, the loss S of the loop is set equal to 30 dB. It is required that the loss S be optimized taking into account various parameters such as applications of the light amplifier. In some cases, the optimal value of the loss S may be quite different from 30 dB.

As described above, the second embodiment is capable of avoiding, in the light amplifier, the occurrence of the light surge pulse itself.

According to the present invention, if light having a level of a signal light higher than a given level passes through an optical fiber, a predetermined light component is applied to the optical fiber in a second direction which is the reverse of (i.e., the opposite of) a first direction in which the signal light is propagated through the optical fiber, whereby the gain of the optical fiber can be reduced. Hence, it is possible to automatically suppress a light surge pulse with good reliability and good response time and to hence avoid control of the exciting light source. Further, it is possible to prevent the light surge pulse from being propagated through the subsequent stage.

The optical system includes an optical path of a loop shape which causes induced emission to occur in the optical fiber in the second reverse when a light exceeding the threshold level is propagated through the optical system. Hence, it is possible to automatically suppress a light surge pulse with good reliability and good responsibility and to hence avoid control of the exciting light source. Further, it is possible to prevent the light surge pulse from being propagated through the subsequent stage.

The optical system includes a first branch coupler which divides light applied to the light amplifier into two light components in a predetermined ratio, one of the two light components being applied to the optical fiber and propagating therethrough in a first direction, an optical path which receives the other one of the two light components from the first branch coupler and contains a saturable absorbent, and a second branch coupler which couples the optical path and the optical fiber together so that the light output from the optical path, in response to the other one of the two light components, is propagated through the optical fiber in the second opposite direction. Hence it is possible to automatically suppress a light surge pulse with good reliability and good responsibility and to hence avoid control of the exciting light source. Further, it is possible to prevent the light surge pulse from being propagated through the subsequent stage.

The length of the optical path is shorter than a distance between the first branch coupler and the optical fiber doped with the rare-earth ion. Hence, the light from the optical system can arrive at the optical fiber before the light from the first coupler reaches thereto.

A detection unit, which is coupled to the optical path, detects the given light component and outputting a detection signal, so that this detection signal can be used as an alarm signal.

The system comprises a light isolator provided in the optical path, so that light can be prevented from being propagated through the optical system in the reverse direction.

A light isolator provided on an input side of the first branch coupler functions to prevent light caused by induced emission in the optical fiber from being applied to the preceding stage in the reverse direction.

The loop, including the optical fiber and the optical system oscillates when light having a level higher than a given level passes through the optical fiber. Hence, it is possible to automatically suppress a light surge pulse with good reliability and good responsibility and to hence avoid control of the exciting light source. Further, it is possible to prevent the light surge pulse from being propagated through the subsequent stage.

The present invention is not limited to the specifically disclosed embodiments, and variations and modifications may be made without departing from the scope of the present invention.

What is claimed is:

1. A light amplifier receiving an input light and comprising:
   an optical fiber doped with, at least, a rare-earth ion, a signal light propagating therethrough in a first direction;
   a light source emitting an exciting light and thereby exciting said optical fiber; and an optical system comprising:
      a first branch coupler which receives and divides the input light into two light components in a predetermined ratio and which are output thereby, a first one of the two light component outputs being applied to said optical fiber for propagating therethrough in the first direction,
      an optical path having first and second ends and a saturable absorbent connected therebetween, the first end of the optical path being connected so as to receive the second one of the two light component outputs of the first branch coupler,
      a second branch coupler which couples the optical path to the optical fiber so that a light output from said optical path, produced in response to the second one of the two light component outputs, propagates through said optical fiber in the second direction, opposite to the first direction, and
      a saturation intensity of said saturable absorbent being higher than an intensity of said signal light, the light being output from the optical path when a light based on the first one of the two light components and propagating through said optical fiber exceeds a threshold level, thereby reducing a gain of the optical fiber.

2. The light amplifier as claimed in claim 1, wherein said optical path comprises a length of glass fiber containing glass doped with erbium as said saturable absorbent.

3. A light amplifier receiving an input light and comprising:
   an optical fiber doped with a rare-earth ion, a signal light propagating therethrough in a first direction;
   a light source emitting an exciting light and thereby exciting said optical fibers; and
   an optical system comprising first and second branch couplers and an optical path, the optical path having first and second ends and a saturable absorbent connected therein, between the first and second ends thereof:
      the first branch coupler receiving the input light and dividing the input light into first and second components having a selected ratio, the first light component being applied by the first branch coupler to the optical fiber and the second light component being applied thereby to the first end of the optical path,
      the second branch coupler coupling the second end of the optical path to the optical fiber, the optical path being responsive to the second light component, when input light exceeding a threshold level propagates through the optical fiber in the first direction, and producing a second light output at the second end thereof which propagates through the optical fiber in a second direction, opposite to the first direction, and reduces a gain of the optical fiber, and a saturation intensity of said saturable absorbent being higher than an intensity of said signal light.

4. The light amplifier as claimed in claim 3, wherein a length of said optical path is shorter than a distance between said first branch coupler and said optical fiber doped with said rare-earth ion.

5. The light amplifier as claimed in claim 3, wherein said optical path comprises a length of glass fiber containing glass doped with erbium as said saturable absorbent.

6. The light amplifier as claimed in claim 3, further comprising detection means, coupled to said optical path, for detecting said light output of the optical path and outputting a corresponding detection signal.

7. The light amplifier as claimed in claim 3, wherein said optical system further comprises a light isolator in said optical path.

8. The light amplifier as claimed in claim 3, further comprising a light isolator connected to an input side of said first branch coupler.

9. A light amplifier receiving an input light and comprising:

an optical fiber doped with, at least, a rare-earth ion, a signal light being propagated through said optical fiber;

a light source emitting an exciting light and thereby exciting said optical fiber;

a first branch coupler dividing light applied to said light amplifier in a predetermined ratio;

an optical path having a first end coupled to said first branch coupler and a second end;

a second branch coupler coupled to said second end of said optical fiber;

a light isolator in said optical path;

said optical fiber and said optical path defining a loop which undergoes oscillations when light having a level higher than a given level passes through said optical fiber; and an adjustable attenuator in said loop for adjusting a gain of oscillation occurring in said loop.

10. The light amplifier as claimed in claim 9, wherein said optical fiber contains a saturable absorbent.

11. The light amplifier as claimed in claim 10 wherein the saturable absorbent is erbium.

12. A light amplifier system comprises:

a first light amplifier having a light input and an amplified light output; and a second light amplifier having a light input receiving the amplified light output of the first amplifier and an amplified light output, the second light amplifier comprising:

an optical fiber doped with a rare-earth ion, a signal light propagating therethrough in a first direction, a light source emitting an exciting light and thereby exciting said optical fibers, and an optical system comprising first and second branch couplers and an optical path, the optical path having first and second ends and a saturable absorbent connected therein, between the first and second ends thereof, the first branch coupler receiving the input light and dividing the input light into first and second components having a selected ratio, the first light component being applied by the first branch coupler to the optical fiber and the second light component being applied thereby to the first end of the optical path, the second branch coupler coupling the second end of the optical path to the optical fiber, the optical path being responsive to the second light component, when input light exceeding a threshold level propagates through the optical fiber in the first direction, and producing a second light output at the second end thereof which propagates through the optical fiber in a second direction, opposite to the first direction, and reduces a gain of the optical fiber, and a saturation intensity of said saturable absorbent being higher than an intensity of said signal light.

13. A light amplifier system as recited in claim 12, wherein the first light amplifier further comprises a first isolator connected to the light input, a first erbium-doped optical fiber, a first wavelength duplication multiplexer and an associated first exciting light source, for receiving the light output of the first erbium doped optical fiber and multiplexing same with the exciting light and producing a multiplexed output and a second isolator receiving the multiplexed output of the wavelength duplication multiplexer and propagating same therethrough in the first direction to the amplified light output of the first amplifier.

14. A light amplifier system as recited in claim 12, wherein said optical path comprises a length of glass fiber containing glass doped with erbium as said saturable absorbent.

15. A light amplifier system comprises:

a first light amplifier having a light input and an amplified light output; and a second light amplifier having an input receiving the amplified light output of the first amplifier and a light output, the second light amplifier, comprising:

an optical fiber doped with, at least, a rare-earth ion, a signal light being propagated through said optical fiber, a light source emitting an exciting light and thereby exciting said optical fiber, a first branch coupler dividing light applied to said light amplifier in a predetermined ratio, an optical path having a first end coupled to said first branch coupler and a second end, a second branch coupler coupled to said second end of said optical fiber, a light isolator in said optical path, said optical fiber and said optical path defining a loop which undergoes oscillations when light having a level higher than a given level passes through said optical fiber, and an adjustable attenuator in said loop for adjusting a gain of oscillation occurring in said loop.

16. The light amplifier as claimed in claim 15, wherein said optical path comprises an optical fiber containing a saturable absorbent.

17. The light amplifier as claimed in claim 3, wherein said optical path comprises a length of glass fiber containing glass doped with erbium as said saturable absorbent.

\* \* \* \* \*

UNITED STATES PATENT AND TRADEMARK OFFICE
CERTIFICATE OF CORRECTION

PATENT NO. : 5,537,244
DATED : July 16, 1996
INVENTOR(S) : FUKUSHIMA et al.

It is certified that error appears in the above-indentified patent and that said Letters Patent is hereby corrected as shown below:

Col. 1, line 8, after "and" insert --,--; and after "particularly" insert --,--;
line 56, after "direction" insert --,--.

Col. 2, line 8, after "components" insert --,--.

Col. 4, line 38, change "above optical" to --above light (optical)--;
line 53, after "second" insert --,--.

Signed and Sealed this

Tenth Day of December, 1996

Attest:

BRUCE LEHMAN

Attesting Officer

Commissioner of Patents and Trademarks